(12) United States Patent
Li et al.

(10) Patent No.: US 9,363,386 B2
(45) Date of Patent: Jun. 7, 2016

(54) ACOUSTIC ECHO CANCELLATION BASED ON ULTRASOUND MOTION DETECTION

(75) Inventors: Ren Li, San Diego, CA (US); Kwokleung Chan, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 797 days.

(21) Appl. No.: 13/416,271

(22) Filed: Mar. 9, 2012

(65) Prior Publication Data

US 2013/0129102 A1    May 23, 2013

Related U.S. Application Data

(60) Provisional application No. 61/563,191, filed on Nov. 23, 2011.

(51) Int. Cl.
| | |
|---|---|
| *A61F 11/06* | (2006.01) |
| *H04M 9/08* | (2006.01) |
| *G06F 1/16* | (2006.01) |

(52) U.S. Cl.
CPC ............. *H04M 9/082* (2013.01); *G06F 1/1694* (2013.01)

(58) Field of Classification Search
USPC .......... 381/71.1, 71.7, 71.11, 71.12, 66, 94.3, 381/122; 715/863; 379/406.01, 406.08; 345/173; 455/570, 556.1; 367/87, 93, 367/95, 99, 118, 127; 370/286, 289; 348/142, 154, 155, 156, 158, 683
See application file for complete search history.

(56) References Cited

U.S. PATENT DOCUMENTS

| | | | |
|---|---|---|---|
| 5,859,914 A | 1/1999 | Ono et al. | |
| 5,999,167 A | 12/1999 | Marsh et al. | |
| 6,454,714 B1 | 9/2002 | Ng et al. | |
| 6,510,225 B1 * | 1/2003 | Robertson et al. | ......... 379/406.1 |
| 6,633,280 B1 | 10/2003 | Matsumoto et al. | |
| 7,843,859 B1 | 11/2010 | Gregorian et al. | |
| 2002/0028699 A1 * | 3/2002 | Moquin et al. | ............... 455/569 |
| 2005/0054931 A1 | 3/2005 | Clark | |
| 2006/0098810 A1 | 5/2006 | Kim | |
| 2007/0259716 A1 | 11/2007 | Mattice et al. | |
| 2008/0208517 A1 | 8/2008 | Shamaie | |
| 2010/0208907 A1 | 8/2010 | Ukai et al. | |
| 2013/0121498 A1 | 5/2013 | Giesbrecht | |
| 2013/0155031 A1 * | 6/2013 | Dahl et al. | .................... 345/177 |
| 2013/0301391 A1 * | 11/2013 | Altman et al. | ................ 367/100 |

FOREIGN PATENT DOCUMENTS

| | | |
|---|---|---|
| CN | 1777819 A | 5/2006 |
| CN | 101461257 A | 6/2009 |

(Continued)

OTHER PUBLICATIONS

International Search Report and Written Opinion for International Application No. PCT/US2012/063786 mailed Mar. 6, 2013, 5pp.

*Primary Examiner* — Vivian Chin
*Assistant Examiner* — Friedrich W Fahnert
(74) *Attorney, Agent, or Firm* — Toler Law Group, PC

(57) ABSTRACT

A method includes receiving an ultrasound signal at an ultrasound receiver from an ultrasound transmitter. The method also includes detecting movement of at least one object based on the received ultrasound signal and at least one previously received ultrasound signal. The method further includes modifying a parameter of an acoustic echo canceller in response to the detected movement.

25 Claims, 8 Drawing Sheets

(56) References Cited

FOREIGN PATENT DOCUMENTS

| | | |
|---|---|---|
| CN | 102165708 A | 8/2011 |
| JP | S6041849 A | 3/1985 |
| JP | 7146988 | 6/1995 |
| JP | 2000253131 A | 9/2000 |
| JP | 2000295338 A | 10/2000 |
| JP | 2009071497 | 4/2009 |
| KR | 1019910005635 | 3/1991 |
| WO | 2007139621 A1 | 12/2007 |
| WO | 2008103919 A2 | 8/2008 |
| WO | 2011033924 | 3/2011 |
| WO | 2011066662 | 6/2011 |

* cited by examiner

ACOUSTIC ECHO CANCELLATION BASED ON ULTRASOUND MOTION DETECTION

I. CROSS-REFERENCE TO RELATED APPLICATIONS

The present application claims priority from U.S. Provisional Patent Application No. 61/563,191 filed Nov. 23, 2011, the content of which is incorporated by reference in its entirety.

II. FIELD

The present disclosure is generally related to echo cancellation and motion detection.

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player.

Some electronic devices, such as wireless telephones, may include adaptive filters that are used in audio signal processing operations. Generally, an adaptive filter may be a signal processing filter that self-adjusts based on an update algorithm. For example, reflective surfaces may be present in unknown locations. As the wireless telephone moves, the reflective surfaces may cause echoes that introduce noise or errors in audio signals. An adaptive filter may be used by an audio receiver of the wireless telephone (or other electronic device) for echo cancellation. As the locations of the reflective surfaces change (e.g., because the audio source and/or destination move), the adaptive filter may self-adjust and a transfer function of the adaptive filter may converge to an adjusted transfer function. To improve performance, it may be preferable for the adaptive filter to converge as quickly as possible.

Acoustic echo cancellation systems typically use an adaptive filter based on a normalized least mean square (NLMS) algorithm. An NLMS adaptive algorithm may depend on a step size factor $\mu$ and may operate iteratively. After each iteration, an output signal of the NLMS algorithm may be compared to a desired signal (i.e., the signal that the NLMS algorithm is attempting to converge the output signal to). Typically, the difference between the output and desired signals (also known as NLMS error) is non-zero, so the NLMS algorithm may self-adjust the value of $\mu$ and other parameters after each iteration. Thus, the value of $\mu$ in each iteration may be modified based on how much error was detected in the previous iteration. Generally, larger values of $\mu$ may result in faster convergence and smaller values of $\mu$ may result in slower convergence. However, the faster an adaptive filter that uses NLMS converges, the greater the amount of residual signals (e.g., echoes) that may be caused by the adaptive filter and that may need correction by a post-convergence filter.

IV. SUMMARY

Instead of reacting to audio error to update acoustic echo cancellation parameters, the proposed system and method use ultrasound signals to detect motion and proactively modify an acoustic echo cancellation parameter (e.g., $\mu$), which may lead to improved echo cancellation (e.g., faster adaptive filter convergence). For example, ultrasound signals may be used to perform motion activity detection (MAD) and proximity detection (PD), and the value of $\mu$ may be modified based on the MAD and PD. MAD may detect moving objects near an ultrasound receiver based on changes in channel response images derived from a received ultrasound signal. PD may detect that a mobile device is proximate to another object (including a non-moving object such as a wall) based on comparing a current channel response image to a calibrated "background" channel response image. Additional detectors and sensors, such as a double-talk detector and an orientation/rotation sensor, may also be used to modify acoustic echo cancellation parameters.

In a particular embodiment, a method includes receiving an ultrasound signal at an ultrasound receiver from an ultrasound transmitter. The method also includes detecting movement of at least one object based on the received ultrasound signal and at least one previously received ultrasound signal. The method further includes modifying a parameter of an acoustic echo canceller in response to the detected movement. In some embodiments, the parameter may correspond to an adaptation rate of an adaptive filter in the acoustic echo canceller.

In another particular embodiment, a system includes an ultrasound receiver configured to receive an ultrasound signal from an ultrasound transmitter. The system also includes a motion activity detection module configured to detect movement of at least one object. The system further includes an acoustic echo canceller configured to modify a parameter of the acoustic echo canceller in response to the detected movement. In some embodiments, the system may include a proximity detector configured to determine, based on channel response images associated with the ultrasound signal and a reflected ultrasound signal, whether the ultrasound receiver is proximate to one or more external objects, and the acoustic echo canceller may be further configured to modify the parameter responsive to the proximity detector.

Particular advantages provided by at least one of the disclosed embodiments include an ability to proactively modify acoustic echo cancellation parameters, such as adaptive filtering parameters, based on information sources not traditionally used in audio signal processing, such as ultrasound-based motion detection and/or proximity detection.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
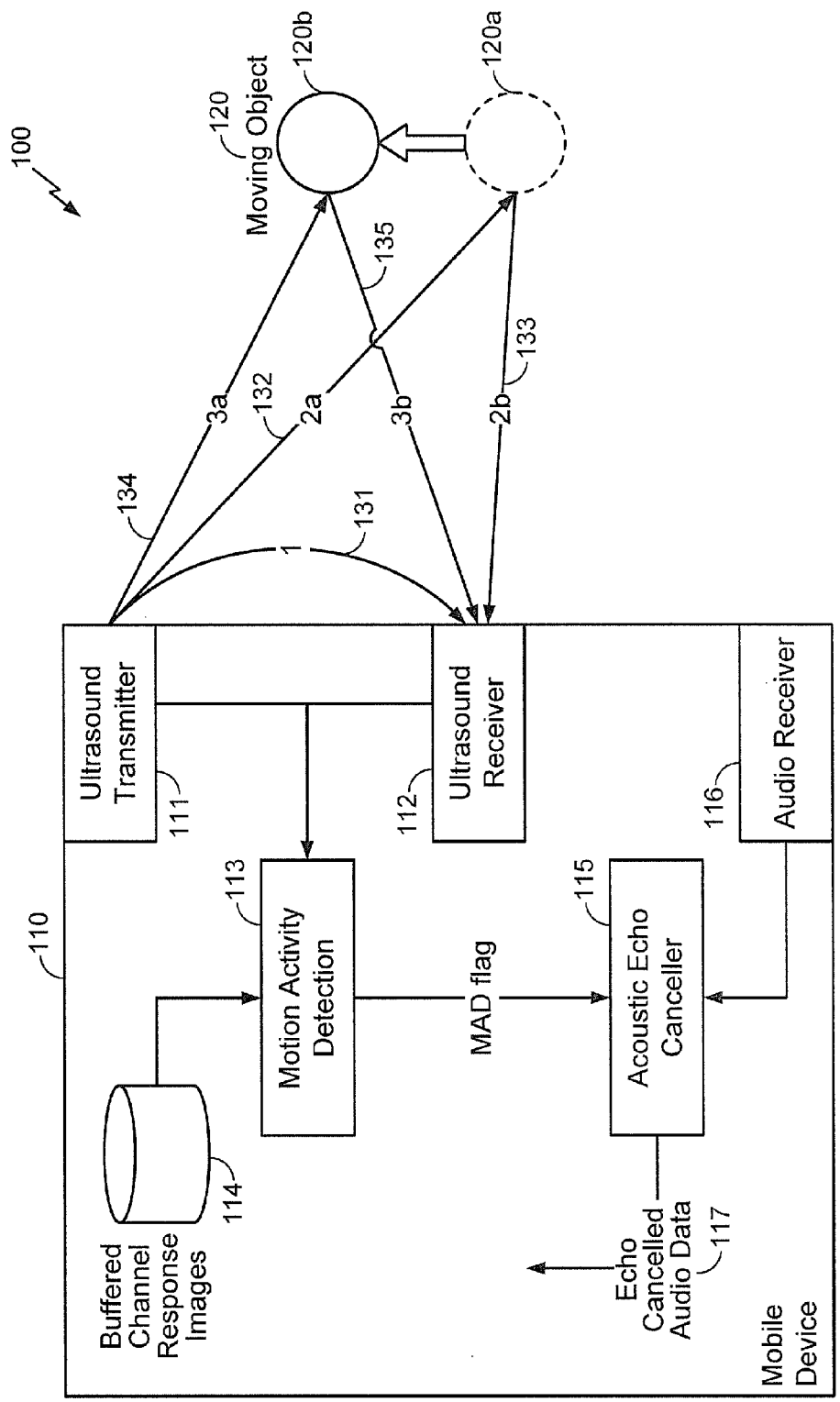
FIG. 1 is a diagram to illustrate a particular embodiment of a system that is operable to perform acoustic echo cancellation based on ultrasound motion activity detection (MAD)

Referring to FIG. 1, a particular embodiment of a system 100 that is operable to perform acoustic echo cancellation based on ultrasound motion activity detection (MAD) is shown. For example, a mobile device 110 may detect that an object 120 is moving or has moved from a first position 120a to a second position 120b based on ultrasound signals.

The mobile device 110 may be a mobile phone, a portable computing device, a tablet computing device, a personal digital assistant (PDA), a portable media player, another mobile device, or any combination thereof. The mobile device 110 may include an ultrasound transmitter 111 and one or more ultrasound receivers (e.g., an illustrative ultrasound receiver 112). In a particular embodiment, the mobile device 110 may include three ultrasound receivers, as further described with reference to FIG. 8.

The ultrasound transmitter 111 may be an ultrasound speaker or other transmitter configured to transmit ultrasound signals during operation of the mobile device 110. For example, the ultrasound transmitter 111 may transmit a first ultrasound signal 131, a second ultrasound signal 132 when the object 120 is located at the first position 120a, and a third ultrasound signal 134 when the object 120 has moved to the second location 120b. The ultrasound receiver 112 may be an ultrasound microphone or other receiver configured to receive ultrasound signals during operation of the mobile device 110. The ultrasound receiver 112 may receive signals directly from the ultrasound transmitter 111 (e.g., the first ultrasound signal 131 via a first echo path) as well as signals that are reflected from one or more objects in the vicinity of the mobile device 110 (e.g., reflected ultrasound signals 133 and 135 via second and third echo paths, respectively).

It should be noted that as used herein, the terms "ultrasound receiver" and "ultrasound microphone" may identify a receiver that is capable of receiving only ultrasound signals (i.e., a dedicated ultrasound receiver) and may also identify a receiver that is capable of receiving other signals as well (i.e., a multi-purpose receiver). For example, the multi-purpose receiver may also be operable to receive audio signals that are within the human range of hearing (e.g., 20 Hz to 20 kHz) and other types of signals (e.g., electromagnetic signals, radio frequency (RF) signals, etc.). Similarly, as used herein, the terms "ultrasound transmitter" and "ultrasound speaker" may identify a transmitter that is capable of transmitting only ultrasound signals (i.e., a dedicated ultrasound transmitter) and may also identify a transmitter that is capable of transmitting other signals as well (i.e., a multi-purpose transmitter). For example, the multi-purpose transmitter may also be operable to transmit audio signals that are within the human range of hearing (e.g., 20 Hz to 20 kHz) and other types of signals (e.g., electromagnetic signals, radio frequency (RF) signals, etc.).

The mobile device 110 may also include a motion activity detection (MAD) module 113. The MAD module 113 may receive input from the ultrasound transmitter 111 and the ultrasound receiver 112, as illustrated. The MAD module 113 may also be configured to access buffered channel response images 114, which may be stored in a memory or other storage device within, coupled to, and/or accessible to the mobile device 110. The MAD module 113 may be configured to detect movement of at least one object (e.g., the object 120). Movement of the object 120 may be detected based on ultrasound signals transmitted by the ultrasound transmitter 111, ultrasound signals received by the ultrasound receiver 112, the buffered channel response images 114, or any combination thereof.

For example, the MAD module 113 may detect movement of nearby objects based on the premise that such movement will disturb a channel response image detected at the ultrasound receiver 112. Thus, channel response changes can be compared with a predetermined threshold value to determine if objects are moving. Non-moving objects may become part of the "background" (e.g., subtracted out) when channel response images are subtracted from previously buffered channel response images. To illustrate, the MAD module 113 may calculate a channel response image based on a received ultrasound signal, compare the calculated channel response image to one of the previously buffered channel response images 114, and assert/de-assert a MAD flag based on whether the difference between the channel response images is greater than a difference threshold.

The mobile device 110 may include an acoustic echo canceller (AEC) 115 that receives the MAD flag from the MAD module 113. The AEC 115 may receive audio signals detected by an audio receiver 116 (e.g., audio microphone) of the mobile device 110. In a particular embodiment, the audio receiver 116 and the ultrasound receiver 112 may be integrated into a single receiver. Based on the MAD flag, the AEC 115 may perform echo cancellation operations on the received audio data to produce echo cancelled audio data 117. For example, the AEC 115 may include an adaptive filter that is responsive to various parameters. In a particular embodiment, the adaptive filter in the AEC 115 may be a normalized least mean square (NLMS) adaptive filter that is responsive to an adaptation rate (e.g., step size factor) $\mu$. The AEC 115 may modify (e.g., increase or decrease) the value of $\mu$ based on the MAD flag.

During operation, the ultrasound transmitter 111 may transmit ultrasound signals. For example, the ultrasound transmitter 111 may transmit the first ultrasound signal 131 that is received by the ultrasound receiver 112 without reflection. When the object 120 is at the first position 120a, the ultrasound transmitter 111 may transmit the second ultrasound signal 132, which may be reflected by the object 120 at the first position 120a and received by the ultrasound receiver 112 as the reflected signal 133. The MAD module 113 may calculate and store a first channel response image based on the reflected signal 133.

When the object 120 is at the second position 120b, the ultrasound transmitter 111 may transmit the third ultrasound signal 134, which may be reflected by the object 120 at the second position 120b and received by the ultrasound receiver 112 as the reflected signal 135. The MAD module 113 may calculate and store a second channel response image based on the reflected signal 135. The MAD module 113 may compute a difference between the second channel response image and the first channel response image and may compare the difference to a difference threshold. In a particular embodiment, the MAD module 113 may buffer multiple channel response frames to form a two-dimensional (2-D) matrix and may subtract a previously buffered 2-D matrix from the formed 2-D matrix. Subtraction of the 2-D matrices may remove direct path effects on the reflected ultrasound signals 133 and 135. When the computed difference is greater than the difference threshold, the MAD module 113 may determine that the object 120 has moved (e.g., from the first position 120a to the second position 120b) and may assert the MAD flag in response. When the computed difference is less than the difference threshold, the MAD flag may be de-asserted.

The AEC 115 may receive audio data from the audio receiver 116 and may perform echo cancellation operations responsive to the MAD flag to generate the echo cancelled audio data 117. In a particular embodiment, the AEC 115 may increase or decrease the adaptation rate $\mu$ of an adaptive filter 115 within the AEC 115 based on the MAD flag. For example, the AEC 115 may increase the adaptation rate $\mu$ when the MAD flag is asserted and may decrease the adaptation rate $\mu$ when the MAD flag is de-asserted.

The system 100 of FIG. 1 may thus enable modification of an acoustic echo cancellation parameter (e.g., p) based on a non-audio information source, such as ultrasound signals. Incorporating non-audio information sources into acoustic echo cancellation may lead to improved acoustic echo cancellation (e.g., due to faster adaptive filter convergence). Ultrasound based motion activity detection (MAD) may also be used to influence post echo cancellation operations, such as post-convergence non-linear processing, as further described with reference to FIG. 3.

In one non-limiting example, the system 100 of FIG. 1 may find application in an audio conferencing or other speech input scenario. During audio conferencing, a speaker or other conference participant may occasionally move in front of the audio receiver 116 (e.g., audio microphone) while listening or talking. When the speaker moves in front of the audio receiver 116, an acoustic channel path may change. Moreover, the channel change due to the speaker's movement may be more prominent than channel changes due to movement of other objects, because of the speaker's proximity to the audio receiver 116. Without use of the MAD module 113, the adaptive filter in the AEC 115 may not react to the speaker's movement until after some audio distortion (e.g., echo effect) has occurred. In contrast, the MAD module 113 may assert the MAD flag based on the speaker's movement in real time or near-real time (e.g., as soon as the speaker begins moving), which may result in faster convergence of the adaptive filter in the AEC 115 and reduced audio distortion.

Figure 2:
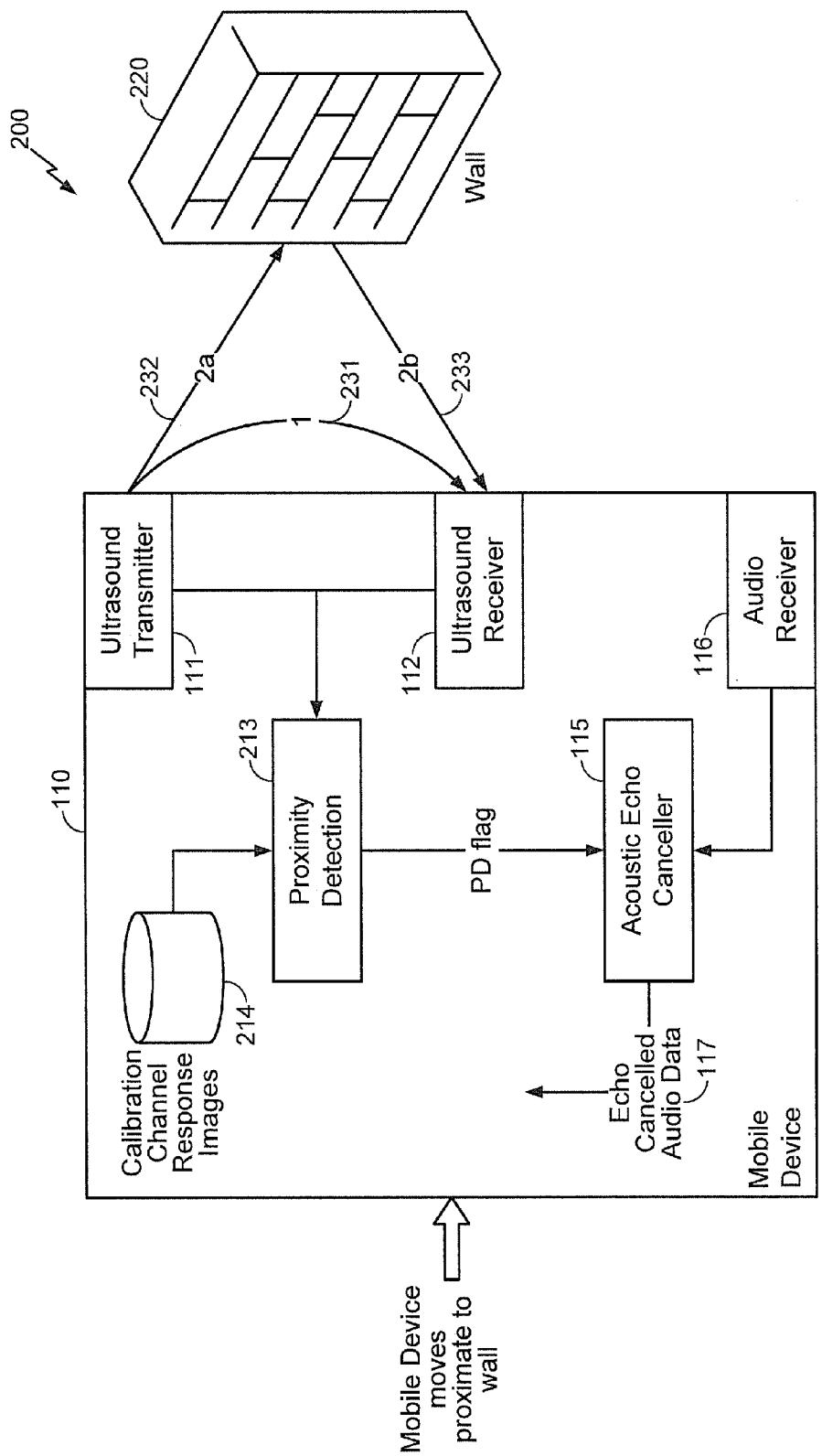
FIG. 2 is a diagram to illustrate a particular embodiment of a system that is operable to perform acoustic echo cancellation based on ultrasound proximity detection (PD)

FIG. 1 illustrates an example of the mobile device 110 detecting motion of an external object 120 based on ultrasound signals. However, it will be appreciated that audio echo may also be present in situations when neither the mobile device 110 nor any nearby external objects are moving (i.e., when the MAD flag generated by the MAD module 113 is de-asserted). For example, echoes may be caused by a wall when the mobile device 110 has moved close to the wall, and may continue to be caused by the wall after the mobile device 110 has stopped moving. Referring to FIG. 2, a particular embodiment of a system 200 that is operable to perform acoustic echo cancellation based on ultrasound proximity detection (PD) is shown. For example, in the embodiment of FIG. 2, the mobile device 110 may detect that it is proximate to an object (e.g., a wall 220) based on ultrasound signals.

The mobile device 110 may include a PD module 213. The PD module 213 may receive input from the ultrasound transmitter 111 and the ultrasound receiver 112 as illustrated. The PD module 213 may also be configured to access calibration channel response images 214, which may be stored in a memory or other storage device within, coupled to, and/or accessible to the mobile device 110. The PD module 113 may be configured to detect that the mobile device 110 is proximate to an object (e.g., the wall 220) based on ultrasound signals transmitted by the ultrasound transmitter 111, ultrasound signals received by the ultrasound receiver 112, the calibration channel response images 214, or any combination thereof. For example, the PD module 213 may assert a PD flag that is provided to the AEC 115 when the mobile device 110 is proximate to the wall 220.

The AEC 115 may adapt echo cancellation operations on audio data received from the audio receiver 116 based on the PD flag. For example, the AEC may modify a parameter, such as the adaptation rate $\mu$ of an adaptive filter, based on the PD flag from the PD module 213.

To illustrate, during operation, the mobile device 110 may compute and store one or more calibration channel response images 214. The calibration channel response images 214 may represent "background" channel response images. For example, "background" channel response images may correspond to conditions when the mobile device 110 is not proximate to any echo-affecting objects, not proximate to any moving objects, and/or proximate to a known reflective surface (e.g., a wall or other immovable object). In a particular embodiment, the PD module 213 may not store a channel response image as a "background" channel response image if there is movement occurring around the mobile device 110. For example, the PD module 213 may not store a calibration channel response image unless the MAD flag produced by the MAD module 113 of FIG. 1 is de-asserted. When the MAD flag is de-asserted, this may indicate that no movement is occurring and that the ultrasound signals may be traveling a pre-trained signal/echo path. In a particular embodiment, pre-trained signal/echo paths may be stored and may be provided to the AEC 115 to achieve faster adaptive filter convergence, as further described with reference to FIG. 3.

As the mobile device 110 moves, the ultrasound transmitter 111 may transmit ultrasound waves, which may be received by the ultrasound receiver 112 via a direct path (e.g., as a first ultrasound signal 231), and via a reflection/echo path (e.g., as a reflected ultrasound signal 233 caused by the wall 220 reflecting a second ultrasound signal 232). The PD module 213 may collect N channel response frames and may compute a difference between the N channel response frames and calibration channel response frames. To illustrate, different channel responses may be obtained by subtracting the one or more calibration channel response images 214 from channel response images corresponding to the received direct path signal 231 and/or the received reflected signal 233. If the difference is greater than a difference threshold, the PD module may assert the PD flag.

The system 200 of FIG. 2 may thus enable proactive modification of an acoustic echo cancellation parameter based on ultrasound proximity detection (PD). For example, the adaption rate $\mu$ of the adaptive filter in the AEC 115 may be increased when the mobile device 110 has moved close to the wall 220, which may result in faster convergence of the adaptive filter. PD may also be used to trigger storage and retrieval of pre-trained echo paths that may be provided to the AEC 115 as "background" signal information, as further described with reference to FIG. 3.

Figure 3:
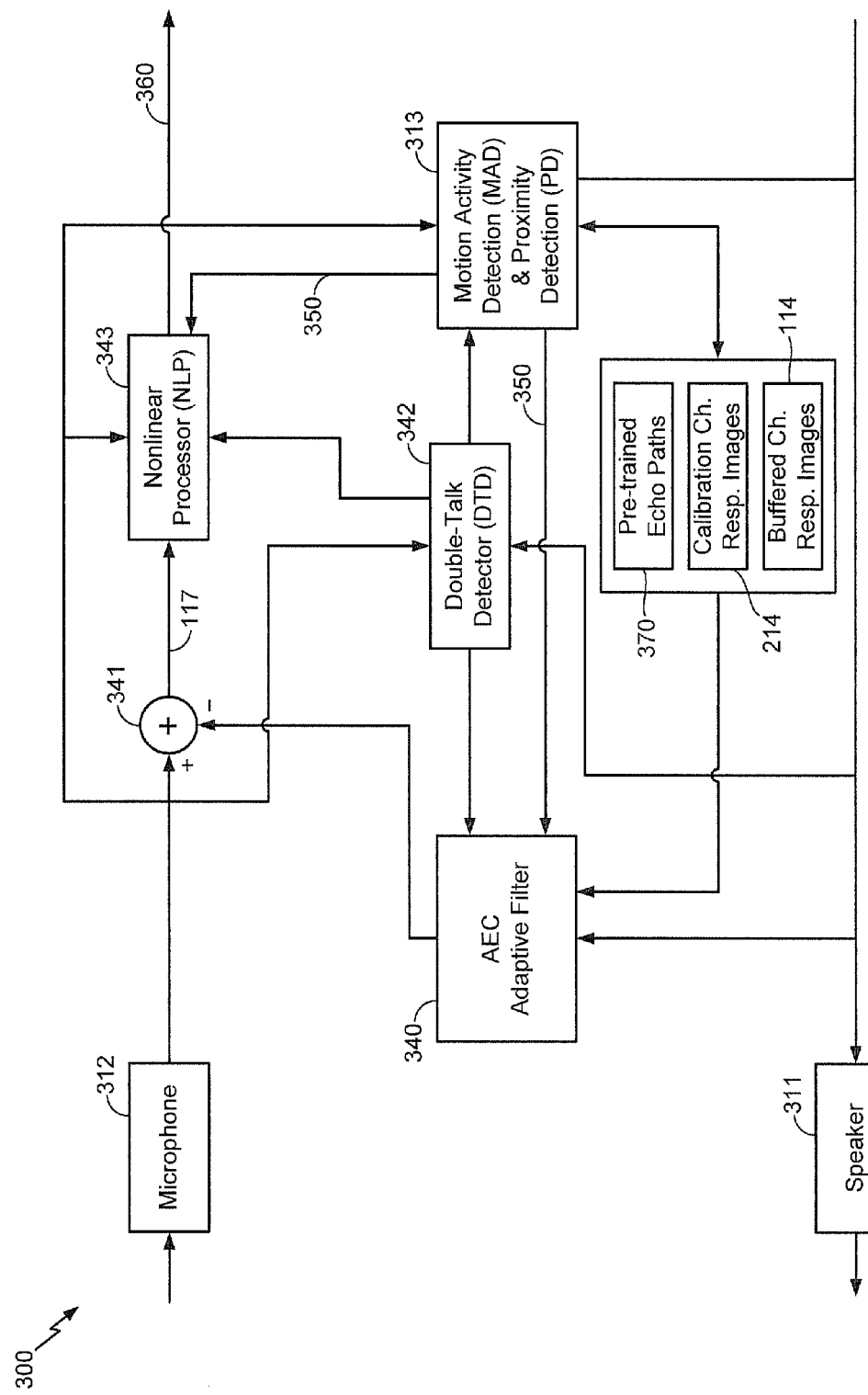
FIG. 3 is a diagram to illustrate a particular embodiment of a system that is operable to perform acoustic echo cancellation based on both ultrasound MAD and ultrasound PD.

It should be noted that although the embodiments of FIG. 1 and FIG. 2 illustrate ultrasound motion audio detection (MAD) and ultrasound proximity detection (PD) separately, MAD and PD may be used together. For example, FIG. 3 illustrates a particular embodiment of a system 300 that includes a MAD/PD module 313 and that is operable to perform acoustic echo cancellation based on both ultrasound MAD and ultrasound PD. In an illustrative embodiment, the MAD/PD module 313 includes the MAD module 113 of FIG. 1 and the PD module 213 of FIG. 2.

The system 300 includes a speaker 311 and a microphone 312. In a particular embodiment, the speaker 311 may be a combined ultrasound and audio speaker, and the microphone 312 may be a combined ultrasound and audio microphone. The system 300 may also include an adder 341 and a double-talk detector (DTD) 342 that is coupled to the MAD/PD module 313, an adaptive filter 340, and a nonlinear processor (NLP) 343. The system 300 may further include the buffered channel response images 114 and the calibration channel response images 214.

The DTD 342 may detect and mitigate audio disruptions caused by double-talk scenarios. For example, during a full-duplex conversation, a loudspeaker signal may be considered a far-end signal and a microphone signal may be considered a near-end signal. Generally, the near-end microphone signal may represent a "desired" signal, and acoustic echo cancellation via adaptive filtering (e.g., by the adaptive filter 340) may involve removing echo effects on the near-end microphone signal. However, the presence of a near-end talker during far-end speech may cause disruption in the operation of the adaptive filter 340. To counter this disruption, it may be beneficial to pause or stop adaptation of the adaptive filter 340 during such double-talk scenarios. Thus, the DTD 342 may detect double-talk scenarios and may notify the adaptive filter 340 and other components of the system 300 when a double-talk scenario is detected.

The MAD/PD module 313 may detect that the echo path of an ultrasound signal has changed (e.g., due to motion of an ultrasound source, an ultrasound receiver, or an intervening object) based on channel response images derived from the ultrasound signal received by the microphone 312 and the buffered channel response images 114, as described with reference to FIG. 1. The MAD/PD module 313 may also detect when the microphone 312 is proximate to another object (e.g., a wall) based on channel response images derived from the ultrasound signal received by the microphone 312 and the calibration channel response images 214, as described with reference to FIG. 2. The MAD/PD module 313 may provide control signals 350 to the adaptive filter 340. For example, the control signals 350 may include a MAD flag and a PD flag and may be used to update an adaptation rate $\mu$ of the adaptive filter 340, as described with reference to FIGS. 1-2. The MAD/PD module 313 may also provide the control signals 350 to the NLP 343.

The NLP 343 may be a post-convergence filter configured to mitigate residual echoes caused by the adaptive filter 340. For example, even though fast convergence of the adaptive filter 340 may be desirable, fast convergence of the adaptive filter 340 may generate residual echoes. The NLP 343 may be responsive to the DTD 342 and to the MAD/PD module 313. In a particular embodiment, the NLP 343 may self-adjust an aggressiveness parameter based on the control signals 350 from the MAD/PD module 313. For example, when a MAD flag in the control signals 350 is asserted (e.g., indicating a path change), the aggressiveness parameter may be increased. Conversely, when the MAD flag is de-asserted, the aggressiveness parameter may be reset to a default value. Use of ultrasound MAD to modify the aggressiveness parameter of the NLP 343 may result in improved echo cancellation at the system 300.

In a particular embodiment, the adaptation rate $\mu$ of the adaptive filter 340 and the aggressiveness parameter of the NLP 343 may also be modified based on an orientation/rotation sensor. For example, the adaptation rate $\mu$ of the adaptive filter 340 may be increased when rotation is detected and may be decreased when rotation is not detected. As another example, the aggressiveness parameter may be increased when rotation is detected and may be reset when rotation is not detected. A particular example of a mobile device including an orientation/rotation sensor is further described with reference to FIG. 8.

During operation, the microphone 312 may receive audio/ultrasound signals, including signals produced by the speaker 311. The DTD 342 may detect a double-talk situation and the MAD/PD module 313 may indicate via the control signals 350 whether objects in the vicinity of the microphone 312 are moving and whether the microphone 312 is proximate to another object (e.g., a wall). Based on the control signals 350, input from the DTD 342 indicating whether a double-talk situation is detected, and far-end signal information, the adaptive filter 340 may output a filter signal to the adder 341. The filter signal may be subtracted from the received audio signal to produce the echo cancelled audio data 117. The echo cancelled audio data 117 may be further processed by the NLP 343 to produce output audio data 360. In particular embodiments, such as in full-duplex audio conferencing, the output data 360 may be sent to the speaker 311 for output.

In a particular embodiment, the system 300 may store pre-trained echo paths 370. For example, before a person in an auditorium begins speaking, the person may walk to various locations on a stage, including locations close to walls, corners, and other objects. At each such location, an echo-path (e.g., including corresponding calibration channel response images 214) may be trained and stored. During the speech, when the proximity detection information indicates that the person has returned to one of the pre-trained locations of the stage, the corresponding pre-trained echo path may be retrieved and provided to the adaptive filter 340. Storing and retrieving pre-trained echo paths based on proximity to known obstacles or reflective surfaces, such as walls, may enable faster convergence of the adaptive filter 340.

The system 300 of FIG. 3 may thus enable proactive modification of the adaptation rate $\mu$ of the adaptive filter 340 based on both MAD and PD, which may result in faster convergence of the adaptive filter 340. The system 300 may also leverage ultrasound signal information to update post-convergence operations at the NLP 343, which may reduce residual echo in the output data 360.

Figure 4:
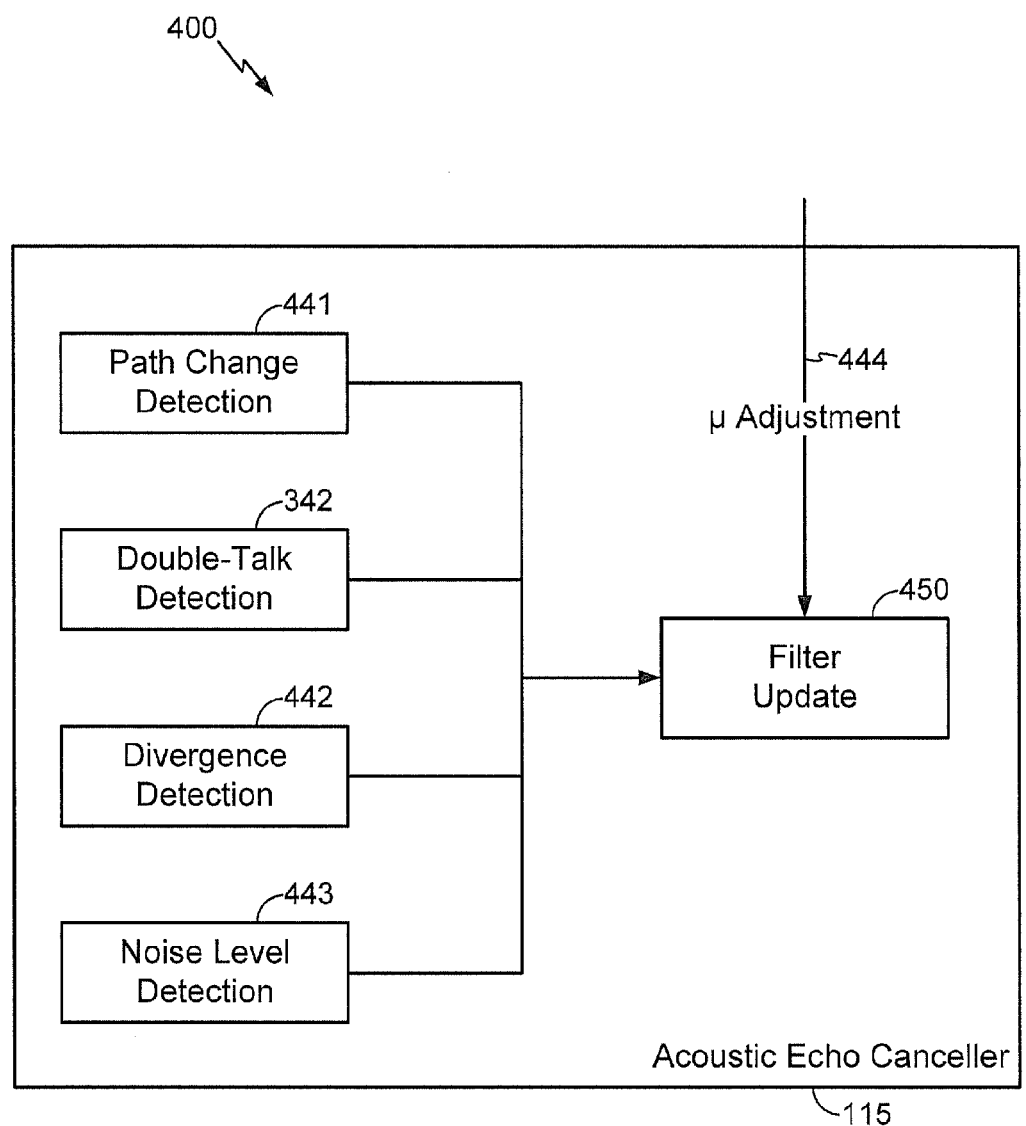
FIG. 4 is a block diagram to illustrate a particular embodiment of filter update sources at the acoustic echo canceller of the systems of FIGS. 1-3.

Adaptive filters may also be adjusted based on information other than MAD, PD, and DTD information. For example, FIG. 4 is a block diagram to illustrate a particular embodiment of filter update sources at the acoustic echo canceller (AEC) 115 (which may include the adaptive filter 340 of FIG. 3).

The AEC 115 may include a filter update module 450 that is responsive to the DTD 343 and to a $\mu$ adjustment signal 444 to update an adaptive filter of the AEC 115. For example, the $\mu$ adjustment signal 444 may include the control signals 350 of FIG. 3, including a MAD flag and a PD flag. The filter update module 450 may also be responsive to a path change detection module 441, a divergence detection module 442, and a noise level detection module 443 to update an adaptive filter of the AEC 115.

For example, when the AEC 115 employs a double filter system, filter learning (e.g., adaptation) may be performed only on filter B while an output signal is provided by filter A. In such a system, coefficients from filter B may be transferred to filter A when convergence is detected. The path change module 441 may monitor the coefficients and echo cancellation performance of filter B to determine whether the echo path has changed and whether a transfer of coefficients from filter B to filter A should be performed and/or if a speedup in learning is needed. The divergence detection module 442 may monitor output energy of filter A to determine whether an incorrect set of coefficients has mistakenly been transferred to filter A and may subsequently reduce filter amplitude or initiate a new coefficients transfer. The noise level detection module 443 may monitor background noise and/or near-end noise and may reduce the adaptation rate µ as noise level increases.

Figure 5:
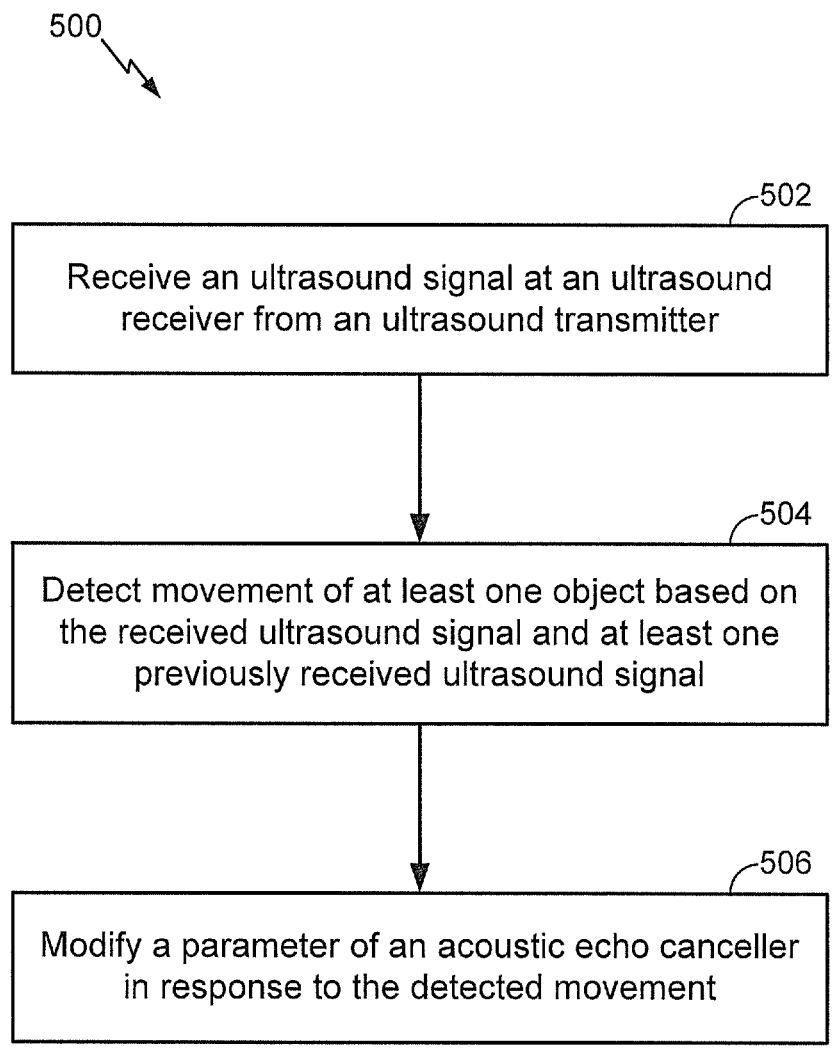
FIG. 5 is a flowchart to illustrate a particular embodiment of a method of performing acoustic echo cancellation based on ultrasound motion detection.

Referring to FIG. 5, a particular embodiment of a method 500 of performing acoustic echo cancellation based on ultrasound motion detection is shown. In an illustrative embodiment, the method 500 may be performed by the mobile device 110 of FIGS. 1-2 and by the system 300 of FIG. 3.

The method 500 may include receiving an ultrasound signal at an ultrasound receiver from an ultrasound transmitter, at 502. For example, referring to FIG. 1, the ultrasound receiver 112 may receive the ultrasound signal 131 from the ultrasound transmitter 111. The ultrasound receiver 112 may also receive the reflected ultrasound signals 133 and 135 generated by reflection of the ultrasound signals 132 and 134 by the object 120. As another example, referring to FIG. 2, the ultrasound receiver 112 may receive the ultrasound signal 231 from the ultrasound transmitter 111 and may receive the ultrasound signal 233 generated by reflection of the ultrasound signal 232 by the wall 220.

Advancing to 504, movement of at least one object based on the received ultrasound signal and at least one previously received ultrasound signal may be detected. For example, in FIG. 1, the MAD module 113 may detect movement of the object 120 from the first position 120a to the second position 120b based on the signals 133 and 135. As another example, in FIG. 2, the PD module 213 may detect that the mobile device 110 has moved proximate to the wall 220 based on the signals 231 and 233.

Continuing to 506, a parameter of an acoustic echo canceller may be modified in response to the detected movement. For example, in FIGS. 1-2, a parameter in the AEC 115 may be modified. In a particular embodiment, the parameter may be an adaptation rate µ of an adaptive filter of the AEC 115.

Figure 6:
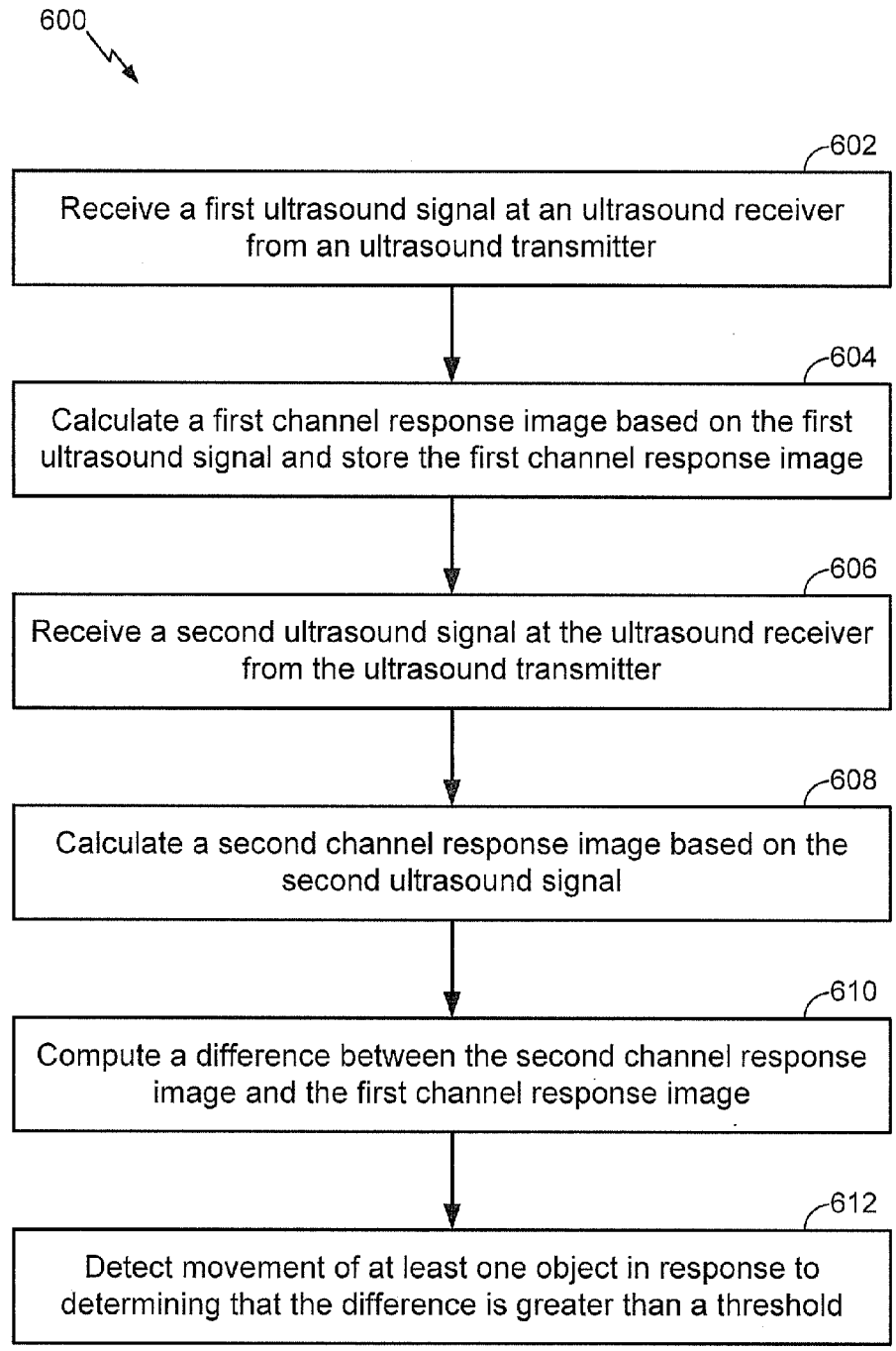
FIG. 6 is a flowchart to illustrate a particular embodiment of a method of performing acoustic echo cancellation based on ultrasound MAD.

Referring to FIG. 6, a particular embodiment of a method 600 of performing acoustic echo cancellation based on ultrasound MAD is shown. In an illustrative embodiment, the method 600 may be performed by the mobile device 110 of FIG. 1 and by the system 300 of FIG. 3.

The method 600 may include receiving a first ultrasound signal at an ultrasound receiver from an ultrasound transmitter, at 602. Continuing to 604, a first channel response image based on the first ultrasound signal may be calculated and stored. For example, in FIG. 1, the ultrasound receiver 112 may receive the first reflected signal 133 and the MAD module 113 may calculate and store a first channel response image based on the first reflected signal 133 in the buffered images 114.

Advancing to 606, a second ultrasound signal may be received at the ultrasound receiver from an ultrasound transmitter. At 608, a second channel response image may be calculated based on the second ultrasound signal. For example, in FIG. 1, the ultrasound receiver 112 may receive the second reflected signal 135 and the MAD module 113 may calculate a second channel response image based on the second reflected signal 135.

Proceeding to 610, a difference between the second channel response image and the first channel response image may be computed. At 612, movement of at least one object may be detected in response to determining that the difference is greater than a threshold. For example, referring to FIG. 1, the MAD module 113 may determine that the object has moved from the first position 120a to the second position 120b based on subtracting the second channel response image from the first channel response image.

Figure 7:
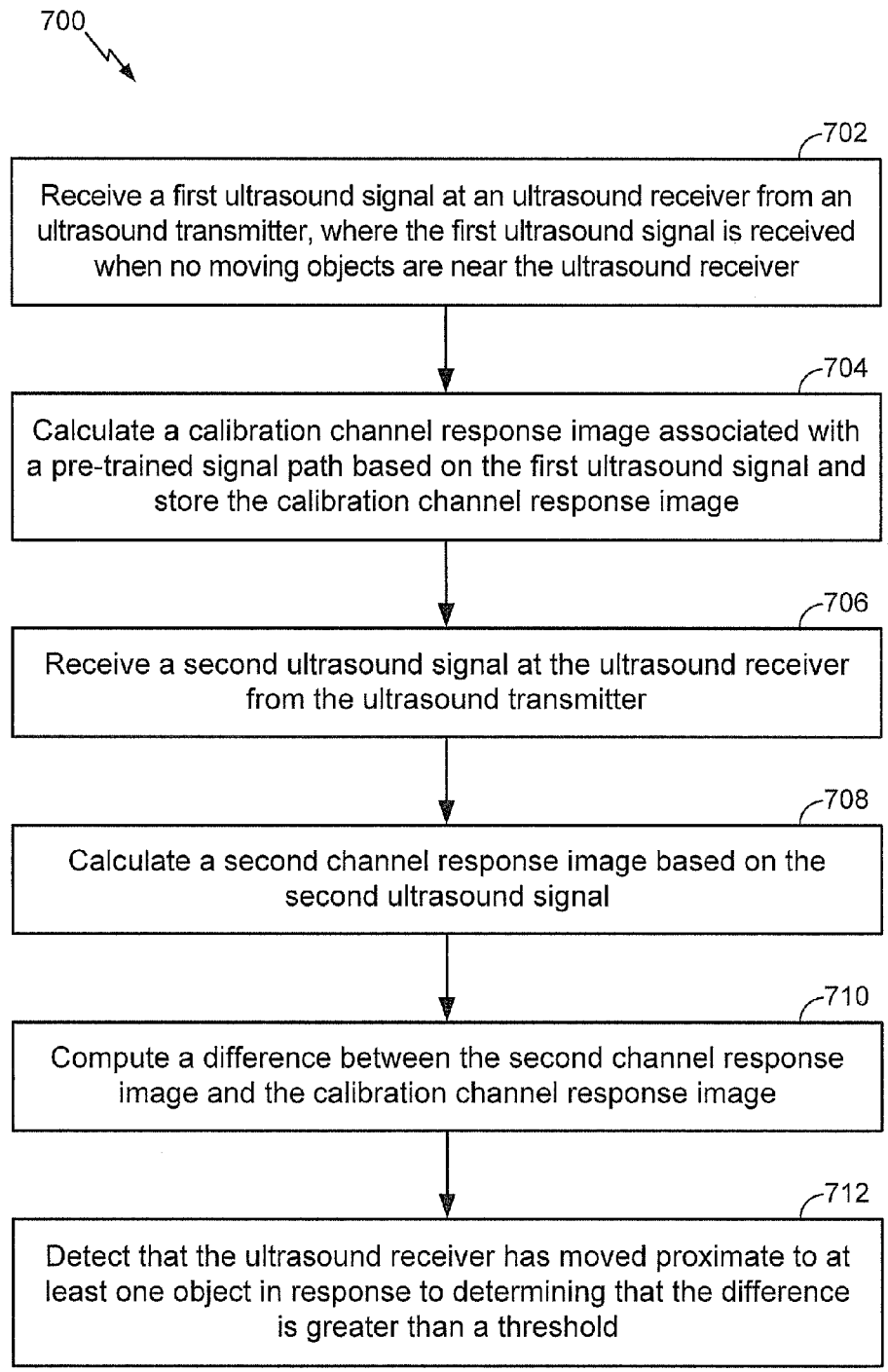
FIG. 7 is a flowchart to illustrate a particular embodiment of a method of performing acoustic echo cancellation based on ultrasound PD.

Referring to FIG. 7, a particular embodiment of a method 700 of performing acoustic echo cancellation based on ultrasound PD is shown. In an illustrative embodiment, the method 700 may be performed by the mobile device 110 of FIG. 2 and by the system 300 of FIG. 3.

The method 700 may include receiving a first ultrasound signal at an ultrasound receiver from an ultrasound transmitter, at 702. The first ultrasound signal may be received when no moving objects are near the ultrasound receiver (e.g., when a MAD flag is de-asserted). Continuing to 704, a calibration channel response image associated with a pre-trained signal path may be calculated based on the first ultrasound signal and may be stored. For example, referring to FIG. 2, the ultrasound receiver 112 may receive the first ultrasound signal 231 and the PD module 213 may calculate and store one of the calibration channel images 214 based on the first ultrasound signal 231.

Advancing to 706, a second ultrasound signal may be received at the ultrasound receiver from an ultrasound transmitter. At 708, a second channel response image may be calculated based on the second ultrasound signal. For example, referring to FIG. 2, the ultrasound receiver 112 may receive the reflected signal 233 and the PD module 213 may calculate a second channel response image based on the reflected signal 233.

Proceeding to 710, a difference between the second channel response image and the calibration channel response image may be computed. The method 700 may include detecting that the ultrasound receiver has moved proximate to at least one object in response to determining that the difference is greater than a threshold, at 712. For example, in FIG. 2, the PD module 213 may determine that the ultrasound receiver 112 (and therefore the mobile device 110) has moved proximate to an object (e.g., the wall 220) based on subtracting the second channel response image from the calibration channel response image.

Figure 8:
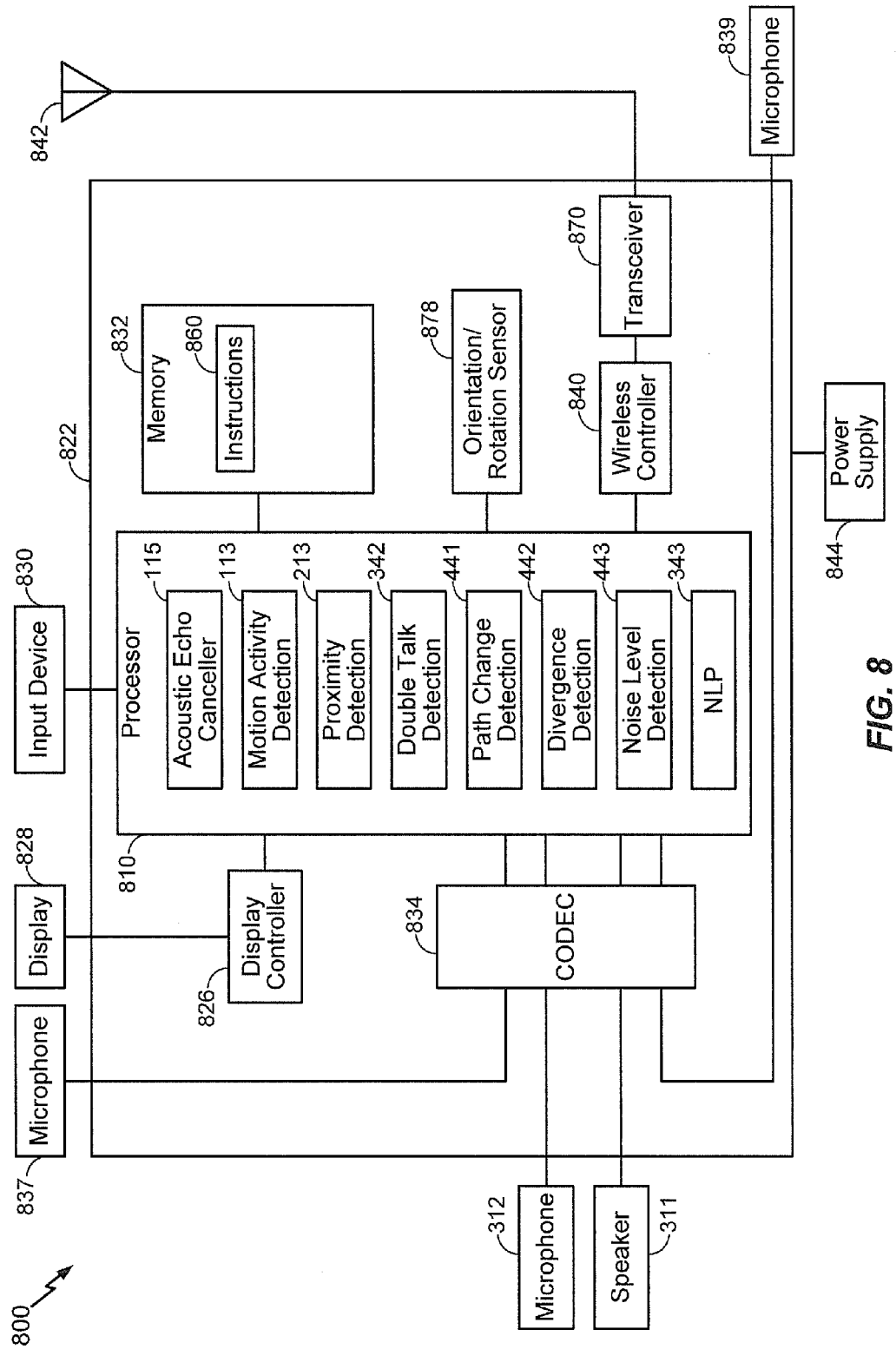
FIG. 8 is a block diagram of a wireless device operable to perform acoustic echo cancellation based on ultrasound motion detection in accordance with the systems and methods of FIGS. 1-7.

Referring to FIG. 8, a block diagram of a particular illustrative embodiment of a wireless communication device is depicted and generally designated 800. The device 800 includes a processor 810, such as an audio digital signal processor (DSP), coupled to a memory 832. In an illustrative embodiment, a memory 832 may store buffered channel response images 114 (of FIGS. 1 and 3), the calibration channel response images 214 (of FIGS. 1 and 3), and the pre-trained echo paths 370 (of FIG. 3). The memory 832 may also store instructions 860 executable by the processor 810 to perform the methods disclosed herein, such as the methods described with reference to FIGS. 5-7.

The device 800 also includes a coder/decoder (CODEC) 834 (e.g., an audio CODEC) coupled to the microphone 312 and to the speaker 311. In a particular embodiment, the microphone 312 and the speaker 311 are capable of simultaneous receipt and transmission of ultrasound signals and audio signals. The CODEC 834 may also be coupled to a second microphone 837 and a third microphone 839.

The processor 810 may include the AEC 115, the MAD module 113 and the PD module 213 (which may be integrated as the MAD/PD module 313 of FIG. 3), the DTD 342, the path change detection module 441, the divergence detection module 442, the noise level detection module 443, and the NLP 343, each of which may be implemented in the processor 810 using hardware, software instructions (e.g., the instructions 860) executable by the processor 810, or any combination thereof.

In a particular embodiment, the device 800 may perform acoustic echo cancellation. Initially, the DTD 342 may monitor for double-talk scenarios based on near-end signals (e.g., signals received via one or more of the microphones 312, 837, and 839) and far-end signals (e.g., signals transmitted by the speaker 311). The AEC 115 may perform echo cancellation based on the near-end signals, the far-end signals, and the DTD 342. The MAD module 113 may detect motion of external objects that may keep the adaptive filter in the AEC 115 from converging and/or from converging quickly. When the MAD module 113 detects motion, the AEC 115 may self-adjust one or more parameters and the adaptive filter may converge faster. For example, when the MAD module 113 asserts a MAD flag, the AEC 115 may update the adaptation rate μ of the adaptive filter in a near-end mode, a far-end mode, a double-talk mode, and/or a silence mode (e.g., when no audio signals are detected). The PD module 213 may generate calibration channel responses corresponding to pre-trained echo paths. In a particular embodiment, the PD module 213 may not generate a calibration channel response if the MAD module 113 detects motion. In addition, when the PD module 213 detects that the device 800 is proximate to one or more objects, the AEC 115 may self-adjust one or more parameters and the adaptive filter may converge faster. For example, the PD module 213 may assert a PD flag and the AEC 115 may update the adaptation rate μ of the adaptive filter and/or retrieve a pre-trained echo path that is copied into the AEC 115 as "background" signal information.

The NLP 343 may also self-adjust based on the MAD module 113 and the PD module 213 to remove residual echoes from data output by the AEC 115. The path change detection module 441, the divergence detection module 442, and the noise level detection module 443 may also be used to selectively speed up adaptive filter convergence in the AEC 115. In a particular embodiment, the AEC 115 and/or the NLP 343 may also be responsive to an orientation/rotation sensor 878 (e.g., including an accelerometer and/or a gyroscope) to self-adjust one or more parameters.

FIG. 8 also shows a display controller 826 that is coupled to the processor 810 and to a display 828. FIG. 8 also indicates that a wireless controller 840 can be coupled to the processor 810 and to a transceiver 870 that is coupled to a wireless antenna 842.

In a particular embodiment, the processor 810, the display controller 826, the memory 832, the CODEC 834, the wireless controller 840, and the transceiver 870 are included in a system-in-package or system-on-chip device 822. In a particular embodiment, an input device 830 and a power supply 844 are coupled to the system-on-chip device 822. Moreover, in a particular embodiment, as illustrated in FIG. 8, the display 828, the input device 830, the speaker 311, the microphones 312, 837, and 839, the wireless antenna 842, and the power supply 844 are external to the system-on-chip device 822. However, each of the display 828, the input device 830, the speaker 311, the microphones 312, 837, and 839, the wireless antenna 842, and the power supply 844 can be coupled to a component of the system-on-chip device 822, such as an interface or a controller.

Those of skill would further appreciate that the various illustrative logical blocks, configurations, modules, circuits, and algorithm steps described in connection with the embodiments disclosed herein may be implemented as electronic hardware, computer software executed by a processing device such as a hardware processor, or combinations of both. Various illustrative components, blocks, configurations, modules, circuits, and steps have been described above generally in terms of their functionality. Whether such functionality is implemented as hardware or executable software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in a non-transitory storage medium such as random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or a user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method of adjusting echo cancellation, the method comprising:
   receiving an ultrasound signal at an ultrasound receiver of a mobile device;
   detecting movement of the mobile device based on the received ultrasound signal and at least one previously received ultrasound signal; and
   modifying acoustic cancellation parameter data of an acoustic echo canceller based on detecting; the movement and at least one of a double-talk scenario, a path change, a divergence, or a noise level.

2. The method of claim 1, wherein the acoustic cancellation parameter data includes an adaptive filtering parameter.

3. The method of claim 1, wherein the movement is detected in response to determining that a difference between a channel response associated with the ultrasound signal and a previously generated channel response is greater than a threshold.

4. The method of claim 3, wherein the previously generated channel response comprises a calibration channel response associated with a pre-trained signal path.

5. The method of claim 1, wherein the acoustic cancellation parameter data includes an acoustic cancellation parameter, and wherein the acoustic cancellation parameter indicates an adaption rate of an adaptive filter in the acoustic echo canceller.

6. The method of claim 1, wherein:
detecting the double-talk scenario comprises monitoring for double-talk based on a near-end signal and a far-end signal,
detecting the path change comprises monitoring filter coefficients and echo cancellation performance of a filter to determine whether an echo path has changed and whether a transfer of coefficients from the filter to a second filter should be performed,
detecting the divergence comprises monitoring an output energy of the second filter to determine whether incorrect coefficients have been transferred from the filter to the second filter, and
detecting the noise level comprises monitoring at least one of background noise and the near-end signal.

7. A mobile device comprising:
an ultrasound transmitter;
an ultrasound receiver configured to receive an ultrasound signal;
a motion activity detector configured to detect movement of at least one object based on the ultrasound signal; and
an acoustic echo canceller configured to modify acoustic cancellation parameter data based on detecting: the movement and at least one of a double-talk scenario, a path change, a divergence, or a noise level.

8. The mobile device of claim 7, wherein the acoustic echo canceller includes an adaptive filter, wherein the acoustic cancellation parameter data includes an acoustic cancellation parameter, and wherein the acoustic cancellation parameter indicates an adaption rate of the adaptive filter.

9. The mobile device of claim 7, wherein the motion activity detector is further configured to detect the movement of the at least one object based on the received ultrasound signal and at least one previously received ultrasound signal.

10. The mobile device of claim 7, wherein the ultrasound transmitter is configured to continuously transmit the ultrasound signal during operation of the mobile device.

11. The mobile device of claim 10 wherein the ultrasound receiver is configured to receive the ultrasound signal via a first signal path between the ultrasound transmitter and the ultrasound receiver and to receive a reflected ultrasound signal via a second signal path between the ultrasound transmitter and the ultrasound receiver.

12. The mobile device of claim 7, wherein the at least one object detected by the motion activity detector is external to the mobile device, the mobile device further comprising:
a proximity detector configured to detect movement of the mobile device based on the ultrasound signal and at least one previously received ultrasound signal,
wherein the acoustic echo canceller is further configured to modify an acoustic cancellation parameter of the acoustic cancellation parameter data responsive to the proximity detector.

13. The mobile device of claim 12, wherein the movement of the mobile device comprises a movement of the mobile device to a position proximate to a second object, and wherein the ultrasound receiver is configured to receive the ultrasound signal while the mobile device is proximate to the second object.

14. The mobile device of claim 7, further comprising
a double-talk detector configured to detect the double-talk scenario and output a notification to the acoustic echo canceller when the double-talk scenario is detected; and
a filter updater coupled to the acoustic echo canceller, the filter updater responsive to at least one of the double-talk detector, a path change detector, a divergence detector, or a noise level detector.

15. A mobile device operable to perform acoustic echo cancellation, the mobile device comprising:
an ultrasound transmitter;
an ultrasound receiver configured to receive an ultrasound signal;
a motion activity detector configured to detect movement of at least one object based on the ultrasound signal;
an acoustic echo canceller configured to modify an acoustic cancellation parameter in response to the detected movement; and
a processor configured to modify a parameter of the mobile device based on detecting: the movement and at least one of a double-talk scenario, a path change, a divergence, or a noise level.

16. The mobile device of claim 15, further comprising an adaptive filter coupled to the acoustic echo canceller, the acoustic cancellation parameter indicating an adaption rate of the adaptive filter, wherein the acoustic echo canceller is part of an integrated circuit.

17. A mobile device comprising:
means for receiving an ultrasound signal;
means for detecting movement of the mobile device based on the ultrasound signal and at least one previously received ultrasound signal; and
means for modifying acoustic cancellation parameter data of an acoustic echo canceller based on detecting: the movement and at least one of a double-talk scenario, a path change, a divergence, or a noise level.

18. The mobile device of claim 17, further comprising a filter updater coupled to the means for modifying the acoustic cancellation parameter data, the filter updater responsive to at least one of a double-talk detector, a path change detector, a divergence detector, or a noise level detector.

19. The mobile device of claim 17, further comprising:
means for transmitting the ultrasound signal; and
means for detecting movement of at least one object external to the mobile device based on channel response images associated with the ultrasound signal,
wherein the means for modifying the acoustic cancellation parameter data is responsive to the means for detecting the movement of the at least one object.

20. The mobile device of claim 17, wherein the acoustic echo canceller is part of an integrated circuit.

21. A non-transitory processor-readable medium storing instructions that, when executed by a processor, cause the processor to initiate operations comprising:
receive an ultrasound signal at an ultrasound receiver of a mobile device;
detect movement of the mobile device based on the received ultrasound signal and at least one previously received ultrasound signal; and
modify acoustic cancellation parameter data of an acoustic echo canceller based on detecting: the movement and at least one of a double-talk scenario, a path change, a divergence, or a noise level.

22. The non-transitory processor-readable medium of claim 21, wherein the acoustic cancellation parameter data includes an acoustic cancellation parameter, and wherein the acoustic cancellation parameter indicates an adaptation rate of an adaptive filter in the acoustic echo canceller.

23. The non-transitory processor-readable medium of claim 20, further comprising instructions that, when executed by the processor, cause the processor to:
- calculate a channel response based on the ultrasound signal;
- compute a difference between the channel response and at least one previously calculated channel response; and
- detect the movement in response to determining that the difference is greater than a threshold.

24. The non-transitory processor-readable medium of claim 23,
- wherein the at least one previously calculated channel response comprises a calibration channel response associated with a pre-trained signal path.

25. The non-transitory processor-readable medium of claim 23, further comprising instructions that, when executed by the processor, cause the processor to store the channel response.

* * * * *